United States Patent [19]

Quadri

[11] 3,760,386

[45] Sept. 18, 1973

[54] MAGNETIC DOMAIN LOGIC DECODER

[75] Inventor: Farooq Quadri, Addison, Ill.

[73] Assignee: GTE Automatic Electric Laboratories, Incorporated, Northlake, Ill.

[22] Filed: July 27, 1972

[21] Appl. No.: 275,661

[52] U.S. Cl....................... 340/174 TF, 340/174 ZA
[51] Int. Cl............................................. G11c 11/14
[58] Field of Search.................................... 340/174

[56] References Cited

OTHER PUBLICATIONS

IBM Technical Disclosure Bulletin–Vol. 14 No. 8 January, 1972 pg. 2,304–2,305.

*Primary Examiner*—James W. Moffitt
*Attorney*—K. Mullerheim et al.

[57] ABSTRACT

Gate for directing propagation of bubble domains entering an intersection of propagation channels comprises a pair of closed loop channels, one within the other, the outer loop having a bubble-holding position adjacent said intersection. Selection of one channel at the intersection is made by transferring bubbles from the inner to the outer loop, causing a bubble to be positioned adjacent said intersection, thus deflecting a bubble entering the intersection into the desired route.

6 Claims, 4 Drawing Figures

MAGNETIC DOMAIN LOGIC DECODER

This invention relates to the propagation of circular magnetic domains and more particularly to a gate for selecting which of two intersecting pathways a magnetic domain will follow. Still more particularly the invention relates to apparatus for selecting one out of a plurality of shift registers in a bubble memory, thereby substantially reducing the power and electrical apparatus requirements.

The use of memories employing magnetic circular domains ("bubbles") is known. Such systems generally employ one or more shift registers, each having an associated bubble generator with a gate which is pulsed to route bubbles into the shift register at will. Accordingly, such systems have required as many individual bubble generators as the number of individual shift registers.

In accordance with the invention there is provided a gate system for controlling the propagation of bubbles in such a manner that one bubble generator can be used selectively to supply eight or more shift registers as desired, thereby substantially reducing the number of electrical components and connections and also the amount of power which is consumed. Briefly described, the gate system of the invention employs two closed loop pathways for bubble propagation, one within the other, each of the pathways preferably containing the same number of bubble holding positions. There is also provided means for transferring bubbles from the inner to the outer loop and vice versa at will. The outer loop is so positioned that one of its bubble-holding positions is immediately adjacent the intersection of the pathways at which point the direction of bubble propagation is to be controlled. The bubble-holding position of the outer loop is in such close proximity to the intersection of the bubble pathways that when such position in the outer loop is occupied by a bubble it will repel a bubble traveling in the main pathway into a side route. Alternatively when the outer loop contains no such bubble in close proximity to the main pathway, a bubble traveling along the same will continue along the main pathway. By using a number of such gates, the route taken by a bubble can be controlled as desired.

The invention will be better understood from the following detailed description thereof, taken in conjunction with the accompanying drawings, in which like numerals are used to refer to like elements, and in which.

Figures 1, 3, 4:
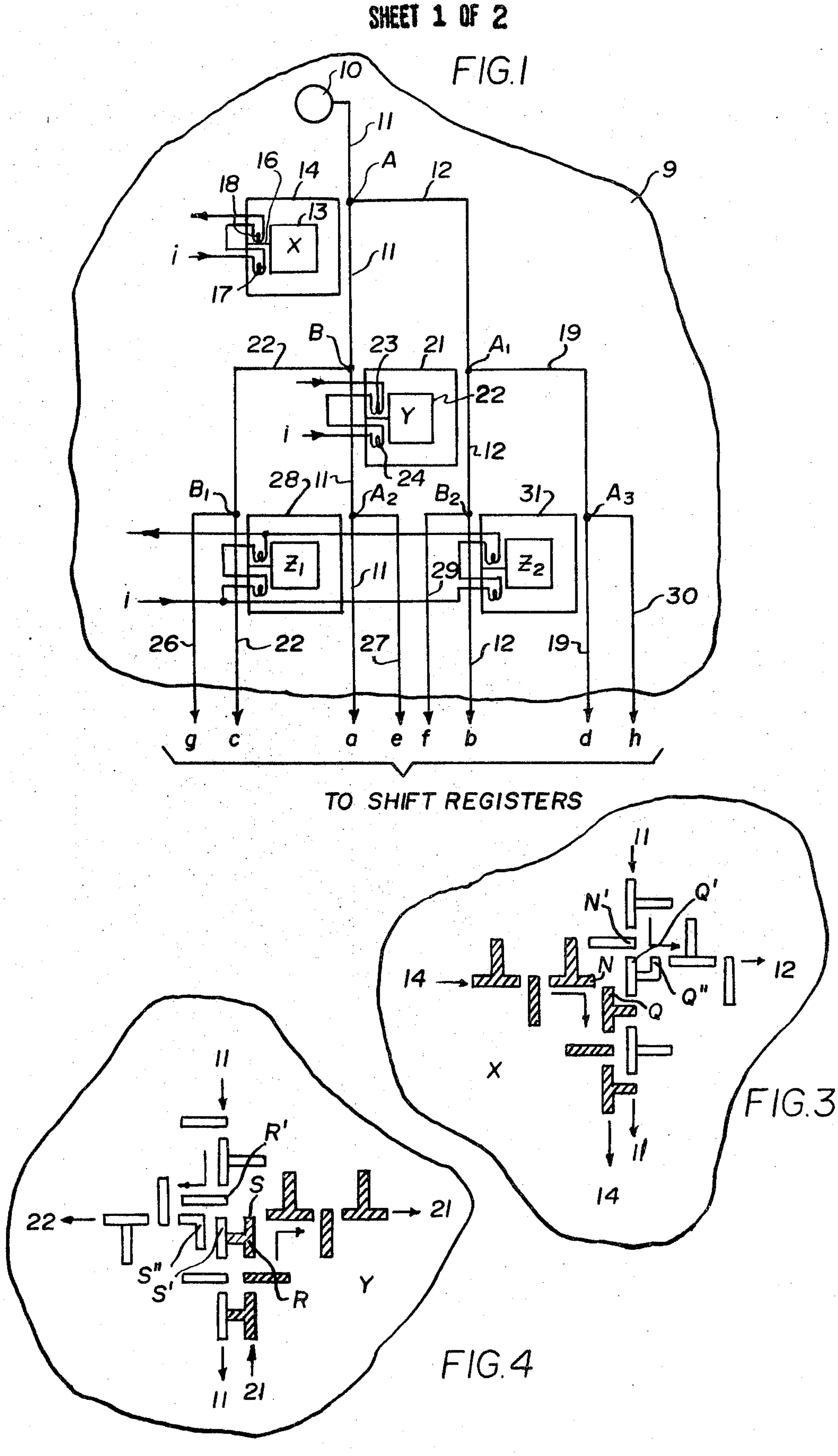
FIG. 1 is a schematic diagram of a system employing a single bubble generator plus a plurality of gates in accordance with the invention which can be manipulated to direct the output of the generator into any selected one of eight shift registers.
FIG. 3 is an enlarged detail of the gate and intersection at the point marked A in FIG. 1.
FIG. 4 is an enlarged detail of the gate and intersection at the point marked B in FIG. 1.

FIG. 1 depicts schematically a bubble domain propagation system including a sheet of magnetic material 9, such as orthoferrite, in which bubble domains can be propagated, and a bubble generator 10, the output of which is fed selectively to any one of shift registers *a–h*, respectively, by suitable operation of the switches generally depicted by X, Y, $Z_1$ and $Z_2$. The bubbles produced by generator 10 travel along pathway 11, the nature of which will be described hereinafter, until they reach the intersection A between pathway 11 and pathway 12 at an angle thereto. The direction which a bubble entering intersection A will take is controlled by gate X comprising an inner loop 13, an outer loop 14, and a connecting pathway 16 between said loops. Each of loops 13 and 14 is comprised of a bubble propagation pathway similar to pathways 11 and 12. Each of loops 13 and 14 has the same number of bubble-holding positions at which bubbles may be present, the bubbles traversing the loop in response to a rotating magnetic field produced in sheet 9 by means not shown. Outer loop 14 is so arranged that it comes within close proximity of the intersection A between pathways 11 and 12, such that if there exists at a given time in the outer loop 14 a bubble in close proximity to the intersection A, another bubble traveling along pathway 11 will be repelled and diverted out of intersection A along pathway 12 rather than continuing along pathway 11. In contrast, the bubble holding positions of inner loop 13 are sufficiently far removed from intersection A so that the existence of bubbles therein will have no effect on a bubble entering intersection A. Accordingly, when bubbles in gate X are traveling within inner loop 13, a bubble entering into section A will continue in a straight line along pathway 11 rather than being deflected into pathway 12. Thus, by transferring the bubbles in gate X between the inner and outer loops along interconnection 16 the bubbles entering section A along pathway 11 can be diverted into pathway 12 or permitted to continue along pathway 11 as desired. The transfer of bubbles from the inner to the outer loops in gate X is accomplished by passing a current pulse *i* through coils 17 and 18, thereby transferring the bubbles between the loops in a manner to be described.

Gate Y is identical in construction with gate X but is used to control the direction of propagation at two intersections, $A_1$ and B. In both cases the operation of the gate is identical to that already described. If there exist bubbles in the outer loop of the gate the bubbles entering the intersection will be deflected to take the side path. Thus, bubbles entering intersection $A_1$ via pathway 12 will be deflected into pathway 19 if bubbles exist in the outer loop 21 of gate Y; otherwise the bubbles will continue through intersection $A_1$ along pathway 12 without being deflected. In a similar manner, bubbles entering intersection B via pathway 11 will be deflected into pathway 22 if the outer loop 21 of gate Y is occupied with bubbles; otherwise they will continue through intersection B along conductor 11. As before, gate Y is provided with means for transferring the bubbles from outer loop 21 to inner loop 22 by means of a current pulse through appropriately spaced coils 23 and 24.

Each of gates $Z_1$ and $Z_2$ is similar in construction and operation to gate Y. Thus, gate $Z_1$ controls intersection $A_2$ and intersection $B_1$, while gate $Z_2$ controls intersections $A_3$ and $B_2$. If the bubbles in gate $Z_1$ are in the outer loop 28, bubbles entering intersections $B_1$ or $A_2$ will be deflected into pathways 26 or 27, respectively; otherwise they will continue along conductors 22 and 11, respectively. In a similar manner, gate $Z_2$ will deflect bubbles entering intersections $B_2$ and $A_3$ into pathways 29 and 30, respectively, if the bubbles in gate $Z_2$ are in the outer loop 31, whereas the bubbles will continue along pathways 12 and 19 respectively if the bubbles in the gate $Z_2$ are in the inner loop.

Gates $Z_1$ and $Z_2$ are wired in parallel, and accordingly a current pulse i is used to control the transfer of bubbles from the inner to the outer loops and vice versa simultaneously in each gate.

It will be seen that by suitable activation of the gates X, Y, and $Z_1$ and $Z_2$ a stream of bubbles can be directed selectively into any of shift registers *a–h* by suitable control of the position of the bubbles in each gate. The table below shows the condition which must exist in each gate for a given shift register to be selected.

TABLE 1

| Shift Register | X | Y | Gate $Z_1$ and $Z_2$ |
|---|---|---|---|
| a | I | I | I |
| b | O | I | I |
| c | I | O | I |
| d | O | O | I |
| e | I | I | O |
| f | O | I | O |
| g | I | O | O |
| h | O | O | O |

I = bubbles in inner loop
O = bubbles in outer loop

Figure 2:
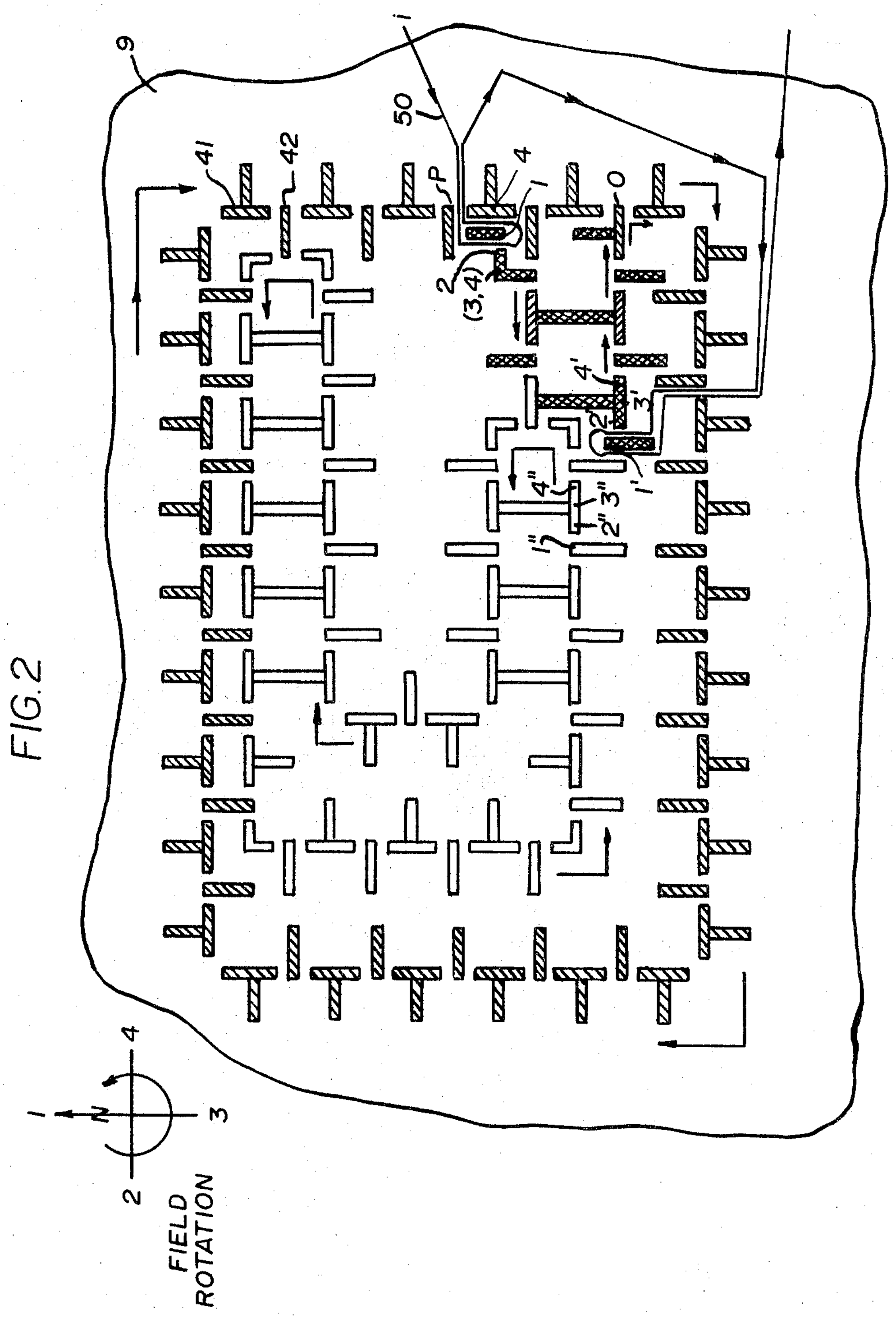
FIG. 2 is a schematic diagram illustrating the inner and outer loop pathways for bubble propagation which constitute a gate, in accordance with the invention.

FIG. 2 shows in detail the construction of the inner and outer loops which constitute a gate in accordance with the invention. The conducting pathway of which each loop is comprised consists of an arrangement of T, e.g., 41, and I bars, e.g., 42, formed of a thin film of permalloy deposited on the magnetic sheet 9 in which the bubbles are propagated, in a known manner. There is also created within the sheet by means not shown a rotating magnetic field which, as indicated by the diagram in the upper left corner of the figure, is assumed to rotate in a counterclockwise direction. The rotating magnetic field induces magnetic poles in the ends of the permalloy sections which alternately attract and repel the bubbles within the magnetic sheet on which the magnetic elements are deposited, causing the bubbles to move in a predetermined pathway. In FIG. 2, all of the T and I elements comprising the outer loop of the gate are single cross-hatched while the elements comprising the inner loop are clear and the elements comprising the connections between the inner and outer loops are double cross-hatched.

The manner in which bubbles can be caused to move in the magnetic sheet can best be explained by assuming that each bubble is a unit south magnetic pole. If the rotating magnetic field which is produced in the magnetic sheet is divided in time into four equal parts, starting with the field pointing north, its counterclockwise rotation can be expressed as north, west, south, east, and north. When the field is pointing north, all of the bars or the sections of the T-shaped elements in FIG. 2 aligned in the north-south direction become magnetized. For example, the bar in the inside loop of FIG. 2 marked 1'' becomes a north pole when the field is pointing north. When the field rotates to west the tip of the T marked 2'' becomes a north pole. Accordingly, a bubble positioned near 1'' is attracted by north pole 1'' and moves to that position when the field is pointing north. When the field rotates counterclockwise by 90°, the bubble moves to 2'' and similarly to 3'', 4'', and so on. With the arrangement of T's and I-bars shown in FIG. 2, a bubble at 1'' would continue in a counterclockwise direction around the inner loop of the gate, in response to the attraction and repulsion produced by the magnetic poles induced by the rotating magnetic field. If, however, when a bubble reaches 4'', a current pulse i is passed through conductor 50, inducing the appearance of a north pole at 1', the bubble will jump to this position (1'). If the current pulse *i* is then turned off at the time the rotating filed points west the bubble will then move to 2', following the path 1', 2', 3' and 4' until it reaches the point O of the outer loop, where it will turn and follow the outer loop in a clockwise direction. Accordingly, by turning on the pulse *i* once for every rotation of the applied magnetic field, there will be diverted one bubble from the inner loop to the outer loop. There are at least as many bubble positions in the inner loop as in the outer loop so that the current pulses are stopped before the first bubble diverted from the inner to the outer loop reaches P in the outer track.

The bubbles now in the outer track will continue to rotate in a clockwise direction in the outer loop until it is desired to transfer them back to the inner loop. To accomplish this transfer, a current pulse *i* is passed through conductor 50 at a time when a bubble reaches point 4 in the outer loop. The induced magnetic pole produced in the bar adjacent point 4 moves the bubble to the left to take the path 1, 2, 3, 4 instead of continuing in the outer loop. Thus, by erecting a current pulse *i* when each bubble arrives at point 4 in the outer track, all of the bubbles can be caused to be diverted back to the inner track.

The manner in which the flow of bubbles in the outer track of a gate functions to divert the stream of bubbles in a main pathway (e.g., 11, in FIG. 1) can be understood from a consideration of FIGS. 3 and 4. FIG. 3 is a detail of the pathways at intersection A of FIG. 1, showing a portion of the upper righthand corner of the outer loop of the gate shown in FIG. 2. FIG. 4 is a detail of intersection B in FIG. 2, showing a portion of the upper lefthand corner of the outer loop of FIG. 2. To understand the operation of the gates, assume that in FIG. 3 bubbles are propagating down pathway 11 from generator 10 and that there are also bubbles in the outer track of gate X, i.e., in pathway 14. When a bubble in the generator path 11 reaches the point marked N', the direction of the applied field will be such that a bubble in gate X will be at the point N. The rotation of the field will cause the bubble at point N to move to point Q. Except for the presence of the bubble at point Q, a bubble at N' would also be attracted to point Q'. Because, however, of the bubble at Q it will be repelled to point Q''. In order for the repulsive effect of an adjacent bubble to be adequate for purposes of the invention, the distance between Q and Q' should be less than about 3 times the diameter of the bubbles. Under the effect of the field and the repulsive effect of a bubble at Q, the bubble at Q' will move perferentially to Q'', from which point it will be moved along pathway 12 by the rotating field. In effect, therefore, a bubble moving along pathway 11 is caused to leave this pathway and enter pathway 12 by the existence of a bubble in the outer loop of gate X in close proximity to the closest approach of the bubble in pathway 11. If no bubbles are present in the outer pathway 14 then the bubble in pathway 11 will continue unimpeded along this pathway.

As shown in FIG. 4, gate Y functions in a similar manner to cause a bubble moving downwardly in pathway 11 to turn to the left and enter pathway 22. A bubble at R in outer loop 21 of gate Y would be attracted to point S by the rotating field. A bubble at point R' in channel 11 would normally be attracted to point S', but because of the presence of the bubble at S will be instead repelled to point S'', from which it will be directed by the rotating field into the side pathway 22. In a similar manner, it will be apparent that the outer gates of the system can be used to direct a bubble into either of two alternative pathways by moving the bubbles in the associated gate from its inner to its outer pathway or vice versa.

In its broadest aspect, the gate of the invention can be used in any application employing magnetic bubbles wherein it is desired to control the direction of propagation of the bubbles along a chosen one out of several possible pathways. In the particular embodiment shown in FIG. 1, a combination of such gates is employed to select a given one of eight shift registers fed by only one bubble generator as opposed to the eight would conventionally have been required. As a result of using one bubble generator, rather than eight bubble generators, to serve eight shift registers, the number of electrical connections is reduced by a factor of 14. Since there are only three switches as opposed to the conventionally required eight, the number of electrical connections is further reduced by a factor of 10. As a consequence of these two factors, the amount of power consumed and the cost and complexity of the circuit are markedly reduced. It will be apparent to one skilled in the art, however, that the method of the invention is not limited to serving only eight shift registers. Any number of shift registers can be employed as will be apparent to those skilled in the art.

The foregoing detailed description has been given for clearness of understanding only, and no unnecessary limitations should be understood therefrom, as modifications will be obvious to those skilled in the art.

I claim:

1. A magnetic domain propagation system comprising a ferromagnetic sheet in which a bubble domain can be propagated, means for producing in said sheet a rotating magnetic field, first and second propagation channels along which said bubble domain can travel, said channels meeting in an intersection, said propagation channels comprising a plurality of permalloy elements appropriately arranged on said sheet to move said bubble therealong by selective magnetic attraction and repulsion between said bubble and magnetic poles induced in said elements by said rotating magnetic field; and gate means arranged at said intersection for selecting either of said propagation channels, said gate means comprising:

a first closed loop bubble channel formed of said permalloy elements, said loop having a plurality of bubble-holding positions, including at least one adjacent said intersection;

a second closed loop bubble channel within said first loop, said second loop having at least as many bubble-holding positions as said first loop; and means for transferring bubbles between said first and second loops, said gate serving to direct a bubble into said first propagation channel when all bubble-holding positions in said first closed loop channel are occupied by bubbles, and into said second channel when said first loop is devoid of bubbles.

2. The system of claim 1 wherein said permalloy elements are T's and I-bars.

3. The system of claim 1 wherein said transfer means between inner and outer loops comprises a bubble propagation channel between said loops and means for actuating a transfer of bubbles from said propagation channels to said transfer channels.

4. The system of claim 3 wherein said transfer actuation means comprises a permalloy element adjacent a closed loop channel, and an electrical coil associated with said element, said element being energized by passage of a current through said coil to deflect a bubble from said loop propagation channel into said transfer channel.

5. The system of claim 1 including a bubble generator and a plurality of shift registers, one shift register being associated with each of said propagation channels, the output of said bubble generator being directed to a selected one of said shift registers by actuation of said gate.

6. The system of claim 1 including a bubble generator, a first shift register fed by said bubble generator, the output of said bubble generator being connected to said intersection, said first and second progagation channels being connected to second and third shift registers, the selection between said second and third shift registers being controlled by actuation of said gate.

* * * * *